Patented Dec. 22, 1931

1,838,070

UNITED STATES PATENT OFFICE

MORTIMER T. HARVEY, OF NEW YORK, N. Y., ASSIGNOR, BY DIRECT AND MESNE ASSIGNMENTS, TO THE HARVEL CORPORATION, A CORPORATION OF NEW JERSEY

COLORS, DYES, AND BASES THEREFOR

No Drawing.   Application filed June 8, 1926.   Serial No. 114,553.

The present invention relates to coloring material and dyes and to dye bases and to methods for the formation of color material, dyes and dye bases. The invention relates more particularly to color material, dyes and dye bases formed from or comprising oil which occurs in the shell of the cashew nut.

I have found that oil from the shell of the cashew nut forms reaction products which have colors desirable and suitable for use in the arts generally and that this oil and some of the reaction products thereof are suitable for dye bases from which various colored dyes and other forms of coloring material may be made.

Examples of materials which will react with cashew nut shell oil to produce colors and color bases are ammonium hydroxide, ammonium carbonate, free ammonia, and formaldehyde. Colors ranging from deep red to violet may be produced by varying the proportions of materials and the time and temperature of the reactions.

Equal volumes of cashew nut shell oil and ammonium hydroxide (26 degrees Baumé) left to stand at room temperature will react to produce colors in from about one to three days time, the color varying with the time of the reaction. The reaction can be stopped by washing out any residual ammonium hydroxide with water and then removing the water as in a separator with ether which latter may be evaporated off. The water may be evaporated completely at 100° C. without affecting the color. The resultant color is substantially unaffected by dilute or concentrated hydrochloric acid or by alkalis. This color which is basically red may be used for printing, for example, as in solution in oils such as linseed oil, oleic acid, and tung oil. The red color is suitable for direct mixture with regular varnishes, stain bases, cellulose acetate and the like in amounts varying with the degree or intensity of color desired and as a waterproof colored plasticizer for cellulose acetate.

This red base may be thickened from its natural consistency which is oily to various degrees of thickness down to a paste by reaction with hydrochloric acid, formaldehyde, or manganese hydroxide or oxide, or by a mixture of any of these. The resultant base is also soluble in the above mentioned oils as well as in the varnishes, stains, and so on.

10 c. c. of the red base, 8 c. c. of concentrated hydrochloric acid, and 3 grains of manganese hydroxide mixed and allowed to stand at room temperature for three to four hours, washed with water, then with a small amount of ammonia, and heated on a water bath to remove excess moisture makes a red paste, suitable for coloring varnishes, oil paints, and lacquers, etc.

Another way of thickening the red oil made by ammoniating the raw oil is to reduce it as with hydrochloric acid and zinc, with sodium amalgam, with hydrogen gas, or with any other reducing means. As an example, one part by volume of the red oil is treated with an equal volume of cencentrated hydrochloric acid and an excess of zinc powder for several hours (12 hours, for example) at room temperature. The consequent reaction produces a paste which has a deep red color. After the desired thickness is obtained the paste is washed with water and then with ammonia water and dried on a water bath or in an oven at 100° C.

A third way of forming the paste from the red oil is to treat it with formaldehyde with or without hydrochloric acid.

An example of forming a product of the invention is as follows. Approximately equal volumes of cashew nut shell oil and ammonium hydroxide solution (26 degrees Baumé) are reacted together to produce a red oil, to about ten parts of which by weight are added eight parts of concentrated hydrochloric acid, and about two and one-half parts of manganese hydroxide to form a red paste, the paste being washed of any residual acid. This paste is suited for use as a color or dye base.

But it is to be understood that these reactions, that is reduction, oxidation, and treatment with formaldehyde, may be carried on with the raw oil first and the ammoniating reaction produced later for making the red paste. Variations may then be made in the process of producing the paste by using any or all of the above set forth steps and in various orders of sequence thereof without departing from the spirit of this invention or from the scope of the invention as set forth in the claims made therefor. In some of the claims the reduction, oxidation, and formaldehyde reactions and equivalent reactions will be designated generically as reactions of Class B.

The paste has a very favorable and durable color and will maintain its color even under high temperatures.

It is to be understood that either the ammoniated oil or the paste may be used as a color or dye. Either may be used for coloring varnishes, paints, oils, etc., or for dyeing oilcloth, linoleum, cellulose lacquer, cellulose acetates, cellulose nitrate, cumarone resin, etc., as well as for general use in the arts.

When used in cellulose acetates, and in the other cellulose compounds, in cellulose lacquer, or in cumarone resin, the red oil, in addition to being a dye, acts and serves as a plasticizer and as a waterproofer. Cellulose acetate or other tissue is rendered waterproof by the addition of the red oil to such a degree that it may be used for packing food and other stuffs for shipment into wet and warm climates. The sheets so made, further have a high degree of flexibility whereby they serve for use in complicated and rapidly operating packing machines without liability of breaking, tearing, or cracking. Also the life of the tissue endures so that goods packed therein will be kept intact over an extended period of time.

I claim:

1. A coloring matter and color base which has cashew nut shell oil as the base thereof.

2. A coloring matter and color base comprising a reaction product of cashew nut shell oil and an ammonium compound.

3. A coloring matter and color base comprising a reaction product of cashew nut shell oil and ammonia.

4. A coloring matter and color base which is a reaction product of cashew nut shell oil and an ammonium compound, and an oxidizing agent.

5. A coloring matter and color base which is a reaction product of cashew nut shell oil and an ammonium compound, and hydrochloric acid and manganese hydroxide.

6. A coloring matter and color base made by reacting cashew nut shell oil with an ammonium compound, and with hydrochloric acid and manganese hydroxide, washing the resultant paste with water and then with ammonia, and heating at about 100° C. to remove moisture.

7. A coloring matter and color base made by reacting equal volumes of cashew nut shell oil and ammonium hydroxide solution (26 degrees Baumé) to produce a red oil.

8. A coloring matter and color base made by reacting equal volumes of cashew nut shell oil and ammonium hydroxide solution (26 degrees Baumé) to produce a red oil, then reacting ten parts by weight of the red oil with about eight parts of concentrated hydrochloric acid, and about two and one-half parts of manganese hydroxide to form a red paste, and washing the paste.

9. A coloring matter which has cashew nut shell liquid as the base thereof.

10. A method of obtaining a coloring matter which comprises reacting cashew nut shell liquid with an ammonium compound.

11. A method of obtaining a coloring matter which comprises reacting cashew nut shell liquid with an ammonium compound and an oxidizing agent.

12. A method of obtaining a coloring matter which comprises reacting cashew nut shell liquid with an ammonium compound, an oxidizing agent and an acid.

MORTIMER T. HARVEY.